(12) United States Patent
Bhardwaj et al.

(10) Patent No.: US 12,353,542 B1
(45) Date of Patent: Jul. 8, 2025

(54) PROVISIONING DATA TO A PLURALITY OF DATA CONSUMERS IN AN ORGANIZATION

(71) Applicant: Morgan Stanley Services Group Inc., New York, NY (US)

(72) Inventors: Madhur Dutt Bhardwaj, Mumbai (IN); Ramdas Puri, Edison, NJ (US); Ramanathan Krishnamurthy, Mumbai (IN); Tarak Mehta, Princeton Junction, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/981,996

(22) Filed: Dec. 16, 2024

(51) Int. Cl.
  *G06F 21/53* (2013.01)
  *H04L 9/40* (2022.01)
  *H04L 41/5019* (2022.01)

(52) U.S. Cl.
  CPC .......... *G06F 21/53* (2013.01); *H04L 41/5019* (2013.01); *H04L 63/0272* (2013.01)

(58) Field of Classification Search
  None
  See application file for complete search history.

(56) References Cited

U.S. PATENT DOCUMENTS

| | | |
|---|---|---|
| 11,238,016 B1 | 2/2022 | Srinivasan |
| 11,526,261 B1 | 12/2022 | Leach et al. |
| 11,902,248 B2 | 2/2024 | Moghe et al. |
| 2019/0013852 A1 | 1/2019 | Sun et al. |
| 2020/0009788 A1 | 1/2020 | Sachs et al. |
| 2020/0020202 A1 | 1/2020 | Kim et al. |
| 2020/0380147 A1* | 12/2020 | Kurian ................ H04L 63/20 |
| 2022/0027191 A1 | 1/2022 | Hay et al. |
| 2023/0006219 A1 | 1/2023 | Kakinuma et al. |
| 2023/0035120 A1 | 2/2023 | Chen et al. |
| 2024/0104580 A1* | 3/2024 | Mekala ............... G06F 16/254 |
| 2024/0295974 A1* | 9/2024 | Badii ................ G06F 3/0653 |
| 2024/0303223 A1* | 9/2024 | Liu .................. G06F 40/197 |

* cited by examiner

*Primary Examiner* — Thu N Nguyen
(74) *Attorney, Agent, or Firm* — K&L Gates LLP

(57) ABSTRACT

A modular data integration system comprising a server system configured to ingest a plurality of data object from a plurality of data sources into a data lake, data warehouse, or both according to business use-cases for a plurality of data consumers. The business use-cases allow the modular data integration system to ingest data objects through independent data channels which meet the requirements of a business purpose and conform with a service level agreement.

13 Claims, 5 Drawing Sheets

PROVISIONING DATA TO A PLURALITY OF DATA CONSUMERS IN AN ORGANIZATION

BACKGROUND

A "data warehouse" and a "data lake" are both modern solutions for managing and storing data for organizations, but they differ significantly in purpose, structure, and usage. A data warehouse is a centralized repository designed to store structured data, typically from various sources within an organization, in a highly organized, relational format. Data in a warehouse is usually processed, filtered, and optimized for specific uses, especially for reporting, business intelligence, and analytics. Organizations rely on data warehouses to provide reliable and consistent information for decision-making processes. The data in a warehouse is typically historical and structured in tables and columns, often updated at regular intervals to reflect new information while maintaining an archive of past data.

To implement a data warehouse, organizations typically use databases like Amazon Redshift, Snowflake, Google BigQuery, or traditional solutions like SQL Server or Oracle Database. The data is often extracted from various transactional systems (such as ERP, CRM, and operational databases), transformed through ETL (Extract, Transform, Load) processes, and then loaded into the warehouse in a structured and accessible format. This structured format ensures that business users and analysts can quickly retrieve, query, and generate reports based on the data, making the data warehouse ideal for predictable queries and historical analysis.

In contrast, a data lake is designed to store vast amounts of raw, unstructured, or semi-structured data in its native format, such as images, text, video, or sensor data, as well as structured data. The data stored in a data lake does not undergo rigorous transformation or filtering processes before storage, allowing organizations to retain all the data they collect. This flexibility enables organizations to use the data lake for a broader range of purposes, including machine learning, advanced analytics, and big data processing, as it can store a wide variety of data types.

Data lakes are implemented on scalable storage systems that can handle extensive data volumes, such as Amazon S3, Microsoft Azure Data Lake Storage, or Apache Hadoop-based systems. Data ingestion happens more freely in a data lake, allowing any data format to be stored without needing to preprocess it. Analysts and data scientists can later process and analyze this raw data with advanced tools, often requiring specialized skills to extract meaningful insights. Since data lakes retain the raw data, they are ideal for exploratory analytics and handling data that may be used for unpredictable or evolving purposes.

Organizations that manage both a data lake and a data warehouse with millions of records that update frequently face several challenges related to data integration, data freshness, storage costs, and performance. These issues often stem from the need to keep both systems synchronized while ensuring efficient and reliable access to up-to-date data.

When records update frequently, maintaining consistency across data lakes and data warehouses becomes complex for an organization. For example, if data is updated daily in the data lake, this updated data must then be processed and transformed before loading it into the structured format of the data warehouse. Organizations must establish reliable, automated processes to capture, transform, and move the latest data into both storage solutions. This process can require sophisticated ETL or ELT (Extract, Load, Transform) pipelines that are challenging to design, maintain, and scale. Without well-designed pipelines, data inconsistencies and latency issues can arise, leading to outdated or conflicting information across the two environments.

Data freshness is another issue. In analytics, having the most current data available is crucial for accurate insights. However, the need to frequently process and load large volumes of updated data into the data warehouse can create latency, especially if the ETL processes are not optimized or if they run only in batches at specific times. In such cases, data in the data warehouse may lag behind real-time data in the data lake, causing reporting and analysis to be based on outdated information. Real-time data pipelines can mitigate this issue but often require additional infrastructure, complexity, and costs.

Storage costs can escalate quickly in both environments when managing large volumes of frequently updated data. Data lakes are typically less expensive for storage since they can store raw data without needing extensive transformation, but they still incur storage and compute costs that can grow with increasing data volume. Data warehouses, however, are more costly to store due to the structured and processed nature of the data. When millions of records are frequently updated, storage demands increase in both environments, and organizations need to carefully manage data retention policies, archiving, and deletion of obsolete data. Without proper management, storage costs can quickly balloon, especially in cloud-based systems with usage-based billing.

Performance is a critical challenge, especially in the data warehouse, where performance may degrade as data volumes grow. Frequent updates mean that the system must repeatedly reprocess and index large datasets, which can strain processing resources and slow down query performance. For data lakes, performance can also be a concern for data retrieval, especially if data isn't well-organized or if indexing and partitioning strategies aren't implemented. In both cases, organizations must invest in performance optimization strategies—such as partitioning, indexing, and caching—to manage these performance issues. Without such optimizations, query speeds may lag, frustrating end-users who rely on real-time analytics.

SUMMARY

In one general aspect, the present invention addresses server level agreement (SLA) challenges that arise when datasets from a plurality of data sources are integrated into data lakes and data warehouses. This problem grows exponentially when dealing with data set with more than 100 million records, that are updated daily, and conform to the business needs of different downstream users. In a conventional data integration system, the data sets are processed linearly or sequentially, which creates dependency between the data lake and data warehouse. This dependency relationship may create performance bottlenecks for not just certain data sets but the entire repository of data. The delayed availability of data may create latency issues that can affect business operations that rely on timely data.

Accordingly, the present invention is directed, in various embodiments, to a modular data integration system for warehousing data from a plurality of data sources associated with business use-cases. Similar data from multiple business channels can be seamlessly integrated within the same data ecosystem preventing the data bottlenecks that occur with a linear integration system. Unlike linear integration systems, a modular data integration system may selectively process datasets based on business purposes for the business data consumer and does not need to be performed data processing for all updated datasets in a sequential process. This creates isolated data integration channels that can reduce the amount of unnecessary data being processed for specific business consumers and ultimately meeting SLA requirements (e.g., data availability time, data governance, data security, error handling).

In one general aspect, therefore, the present invention is directed to a computer-implemented method for provisioning data to a plurality of data consumers in an organization. The method comprises receiving, by a server system, a business use-case for a first data consumer of a plurality of data consumers. The method also comprises determining, by the server system, a data configuration type for the first data consumer based on the business use-case. The method further comprises determining, by the server, a plurality of datasets associated with the first data consumer. The method also includes the step of ingesting, by the server, a plurality of data objects from a plurality of data sources to a plurality of datasets. The method also comprises the step of preparing, by the sever, the two or more datasets of the plurality of datasets according to the data type configuration for the first data consumer. And the method also includes generating, by the server, a combined view of the two or more datasets in a data lake, a materialized view of the two or more datasets in the data warehouse, and wherein the materialized view in the data warehouse is not dependent on the combined view of the data lake.

These and other benefits that can be realized through embodiments of the present invention will be apparent from the description that follows.

BRIEF DESCRIPTION OF THE DRAWINGS

Various embodiments of the present invention are described herein by way of example in conjunction with the following figures.

DETAILED DESCRIPTION

Figure 1:
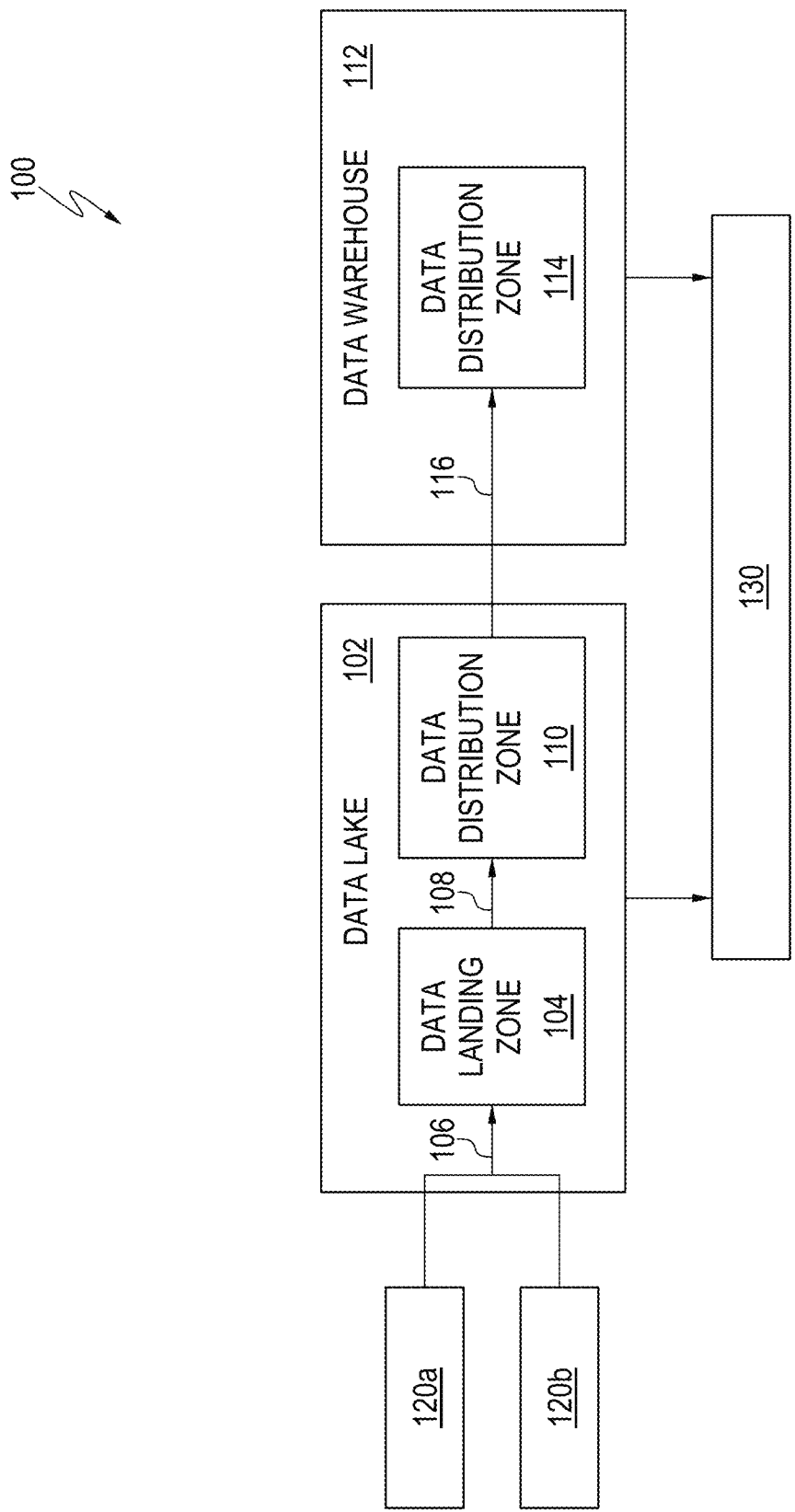
FIG. 1 shows a linear data integration system for integrating data records from a first source and a second source into a data lake and a data warehouse.

FIG. 1 shows a linear data integration system 100 for integrating data records from a first source 120a and a second source 120b into a data lake 102 and a data warehouse 112 for an organization according to known techniques. The data lake 102 comprises a data landing zone 104 and a first data distribution zone 110. The data warehouse comprises a second data distribution zone 114. A plurality of data objects is integrated from each source 120a, 120b at the data landing zone 104, in an unstructured or raw data type. Once the plurality of data objects is received at the data landing zone 104, they may undergo a data curation process to merge structured and unstructured data into an aggregated data set stored in a first data distribution zone 110. The first data distribution zone 110 can then be accessed by a plurality of data consumers within the organization. However, the first data distribution zone 110 may only be available once all data objects are ingested into the data lake 102 and merged/curated into the first data distribution zone 110. Accordingly, the data objects from the first data distribution zone 110 may then also be passed to the data warehouse 112 where the integration system identifies unstructured data or semi-structured data, and transforms the unstructured and/or semi-structured data according to structured data models. The linear nature of the integration system creates bottlenecks at each data staging location that delays the data availability creates SLA obstructions. In many business use-cases, a complete update of all data is not required and may even create data governance issues. Additionally, once an error is present in a data set, it may propagate throughout dependent dataset within the data lake and spread to the data warehouse. The error propagation can be difficult to resolve based on the size of the number of dependent datasets and the number of data objects (e.g., millions of data objects per dataset). Other SLA issues may include insufficient resource allocation and inability to scale resources (e.g., demand periods followed by periods of inactivity, insufficient resources to meet periods of peak demand), data quality and error handling, scalability, data governance and security.

Figure 2:
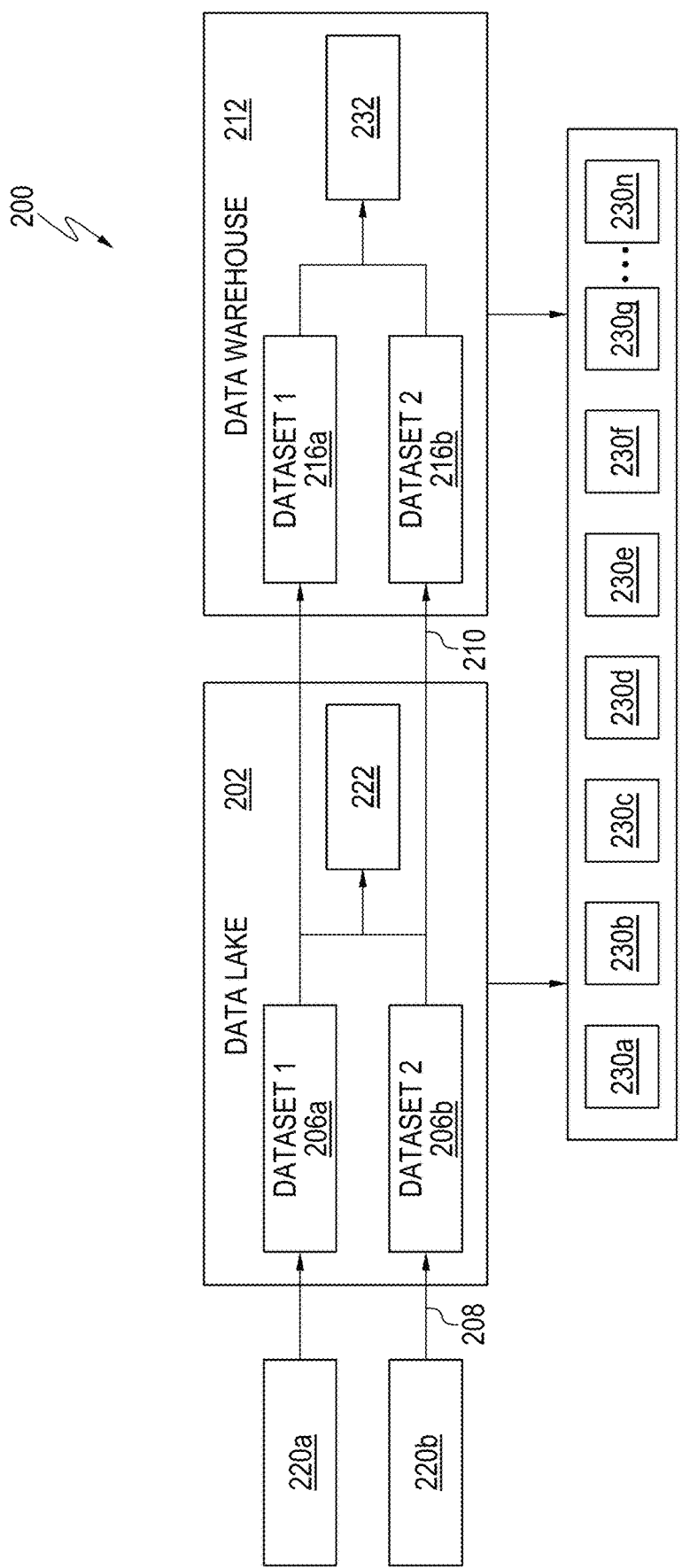
FIG. 2 shows a modular data integration system comprising a data lake and a data warehouse configured to receive a plurality of data objects from a plurality of data sources, through isolated data channels, according to at least one aspect of the present invention.

FIG. 2 shows a modular data integration system 200 according to various embodiments of the present invention that addresses drawbacks with the system of FIG. 1. The exemplary, illustrated modular data integration system 200 comprises a data lake 202 and a data warehouse 212 configured to receive a plurality of data objects from a plurality of data sources 202a-b, through isolated data channels 208, 210, according to at least one aspect of the present invention. The data objects may be simultaneously ingested by the data lake 202 and the data warehouse 212 or individually ingested by either, depending on the business use-case for a data consumer 230. In one example, the data objects are ingested at separate data lake datasets 206a-b and data warehouse datasets 216a-b. In another example, the data objects are ingested into the data lake 202 and transmitted to the data warehouse 212, as received from the data lake 202, while the curation/merging happens in parallel at both the data lake 202 and the data warehouse 212. The data lake 202 may curate and merge the separate datasets 206a-b into a data lake (DL) materialized view 222. The data lake 202 may transform the separate datasets 216a-b into a designated format according to a metadata model and then merge the data objects into a data warehouse (DW) materialized view 232. The materialized data views 222, 232 can be used from both the data lake 202 and data warehouse 212 by the data consumer 230a-n (e.g., downstream service of an organization), depending on the consumption patterns of the data consumer 230a-n. The metadata model may be based on a structure or schema predefined by a business requirement that are curated, conformed, and optimized for query operations.

The data lake 202 may be implemented on a distributed storage system that can scale to handle large data volumes. Cloud storage options include Amazon S3, Microsoft Azure Data Lake Storage, and Google Cloud Storage. An on-premises data lake can be built on Hadoop Distributed File System (HDFS), for example. The data lake 202 may ingest data in raw form, using, for example, a combination of structured (tables, CSVs) and unstructured (audio, video, JSON) formats. A data ingestion tool such as Apache Kafka, Apache Flume, and/or Amazon Kinesis may be used to stream data into the lake 202 in real time. The data lake 202 may be paired with a processing framework like Apache Spark, Apache Flink, and Presto, to allow the data consumer 230 to perform large-scale processing and analysis.

The data warehouse 212 may be implemented using cloud-based solutions like Amazon Redshift, Google Big-Query, or Snowflake, on-premises data, such as with Oracle, Teradata, or Microsoft SQL Server.

In the context of a data lake or data warehouse, a view, such as the materialized views 222, 232 refers to a virtual table that is generated by querying one or more underlying tables, files, or datasets. It does not store actual data itself but provides a way, such as for the data consumers 230a-n, to access and interact with data through predefined queries. Views are used to simplify complex queries, abstract data complexity, or provide security by controlling what data users can see. A view acts like a table, but instead of storing data physically, it can store a SQL query or transformation logic that is executed when the view is accessed. When the data consumers 230a-n queries the view 222, 232, the underlying query retrieves the relevant data from the base tables or datasets. The views 222, 232 can abstract the complexity of the data model, presenting a simplified or more logical representation of the data. This is particularly useful when the underlying schema is complex, and it is desired to expose only a subset of columns or join multiple tables behind the scenes. The views 222, 232 can essentially be predefined SQL queries that can involve joins, aggregations, filters, or transformation of data from one or more tables or datasets, such as DL datasets 206a, 206b for the DL view 222, and DW datasets 216a, 216b for the DW view 232. It can be customized to meet the needs of specific users or applications. Because the views 222, 232 do not store data, they can be always dynamic, reflecting the latest data in the underlying tables or files when queried. When data in the underlying tables changes, the views 222, 232 will return updated results without needing to update the view itself. Also, the views 222, 232 can comprise materialized views, which can physically store the result of a query. Unlike a standard view, a materialized view 222, 232 does not need to re-query the data each time it is accessed, which can improve performance. Also, the materialized views 222, 232 can be periodically refreshed to reflect changes in the underlying data, such as daily as described herein.

In one example, the modular data integration system 200 may impose a data ingestion configuration for data objects accessed by the data consumers 230a-n based on a business use-case. The data ingestion configuration may be configured to integrate millions of data objects from a plurality of data sources on a nightly basis. The modular data integration system 200 determines that the data objects are associated with a business use-case for the data consumers 230a-n that requires the nightly update to be completed by a predetermined time the next day (e.g., 8:00 am EST), according to an SLA. A sequential data integration system (see FIG. 1) may take too long to integrate the update data resulting in data delays and SLA issues for data availability. In the modular data integration system 200 of FIG. 2, however, the business use-case indicates specific dataset and data type configurations that are required for the first data consumer allowing the data to be integrated in parallel because the first data consumer does not require all data objects to be integrated in as structured data in the data warehouse.

The modular data integration system 200 is highly scalable based on the number of data objects in each dataset and the number of data sources. Although the modular system 200 of FIG. 2 shows only two data sources 220a, 220b, the modular data integration system 200 can scale to ingest data objects from an increasing number of data sources with millions of data objects for future integration. The modular data integration system 200 is shown according to various embodiments (see FIGS. 2, 3, and 5) and has the ability to isolate integration channels to increase data security and apply rules for data governance. Therefore, the size of datasets may increase, or the number of data sources may increase without impacting the availability time of certain data channels, based on the business use-case of the data consumer.

In various aspects, the modular data integration system is designed to ensure seamless coexistence of data from various channels for data consumers 230a-n of the organization without affecting applicable SLAs for those consumers 230 for data availability. The system 200 allows individual channels to maintain data availability independently so that data consumers have access to processed, curated, or queryable datasets without impacting by SLA breaches in other channels. The modular approach enhances data governance, data security, and reduces the risk of error propagation throughout datasets. The system also resolves unwanted ETL dependencies based on business use-cases that allows for faster data availability that ultimately saves the enterprise network time and storage.

Figure 3:
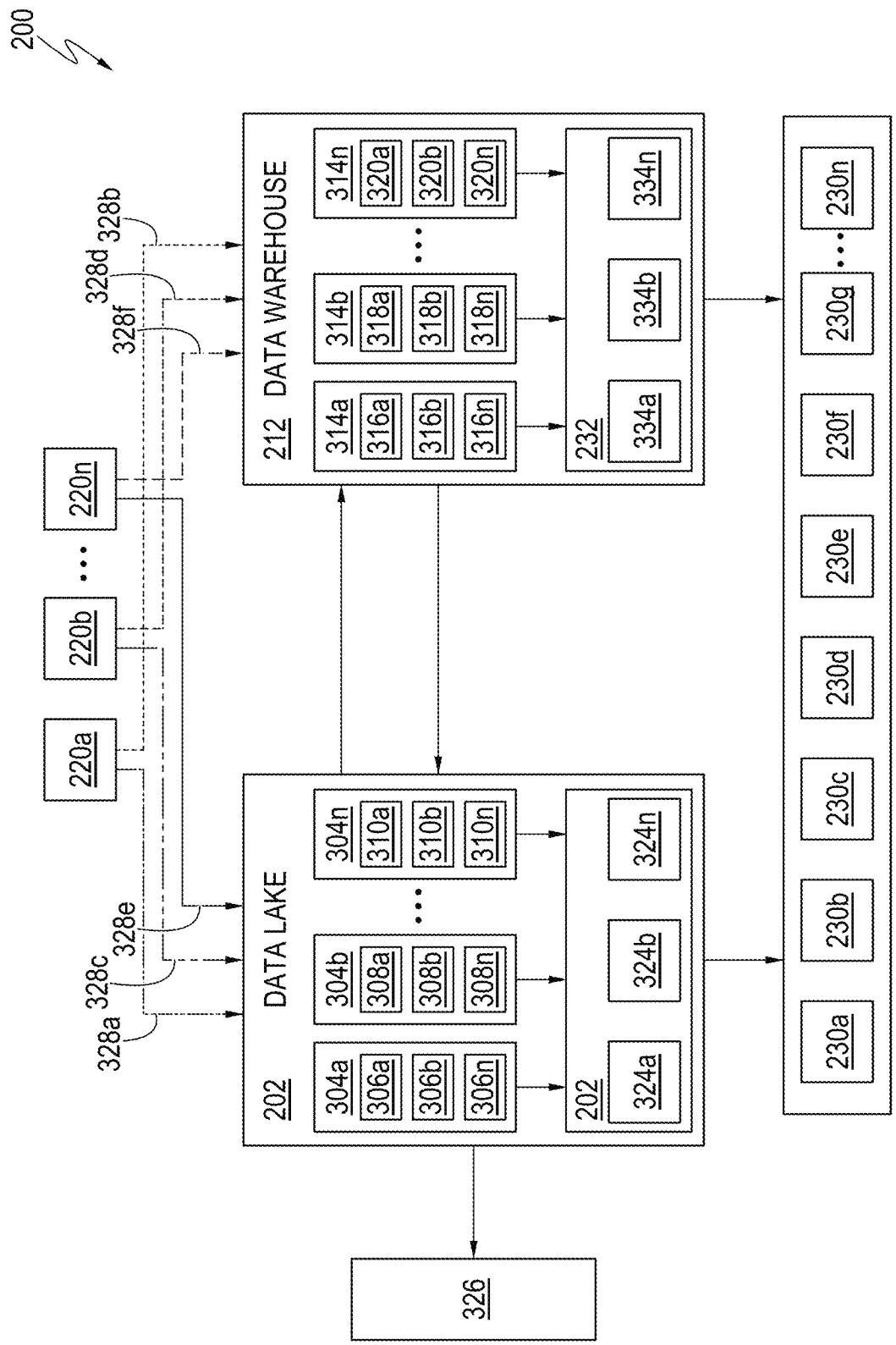
FIG. 3 shows a modular data integration system comprising a data lake and a data warehouse configured to modularly ingest data objects from a plurality of data sources for a plurality of data consumers, according to at least one aspect of the present invention.

FIG. 3 shows a modular data integration system 200 according to another exemplary embodiment of the present invention. The modular data integration system 200 depicted in FIG. 2, comprising a data lake 202 and a data warehouse 212, is configured to modularly ingest data objects from a plurality of data sources 220a-n for a plurality of data consumers 230a-n. The data lake 202 comprises a plurality of data sets 306a-n, 308a-n, 310a-n, where each of the plurality of data sets is associated with a landing zone 304a-n associated with a different business use-case or enterprise organization. The data lake 202 further combines the plurality of datasets 306a-n, 308a-n, 310a-n, into a DL materialized view 222 (e.g., combined view) where a first dataset 324a corresponds to a first set of DL datasets 306a, 308a, and 310a; a second dataset 324b corresponds to second set of DL datasets 306b, 308b, and 310b; and an nth dataset 324n corresponds to an nth set of DL datasets 306n, 308n, and 310n. The data sets in the data lake 202 preferably comprise structured, semi-structured, and unstructured (e.g., raw or unprocessed data types) data types. The data warehouse 212 comprises a plurality of data sets 316a-n, 318a-n, 320a-n, where each of the plurality of data sets is associated with a different landing zone 314a-n associated with a different business use-case or enterprise organization. The data warehouse 212 further transforms the plurality of datasets 316a-n, 318a-n, 320a-n, and integrates them into a DW materialized view 232 (e.g., combined view) where a first dataset 334a corresponds to a first set of DW datasets 316a, 318a, and 320a; a second dataset 334b corresponds to a second set of DW datasets 316b, 318b, and 320b; and an nth dataset 334n corresponds to an nth set of DW datasets 316n, 318n, and 320n. The DW datasets in the data warehouse 312 preferably comprise data objects structured in a relational manner, based on a structure or schema that is predefined for by a business use-case or requirement. The schema may be stored in a database associated with the business use-case and may allow the data objects to be easily accessed through query operations. The business use-cases balance the trade-off between structure and processed data, the amount of data that it actually needed by the data consumer, and the time required for processing the data objects in a structured format for a business purpose. Accordingly, modular data channels 328a-f may be established between the plurality of data sources 320a-n and the data lake 302 and the data warehouse 312, based on the business use-case.

The data consumers 230a-n may comprise downstream business services of the organization that rely on a subset of all DL and/or DW datasets and therefore do not require access to all the datasets. The business use-case indicates the needed data format or structure and the location of the datasets (e.g., data lake 202, data warehouse 212, or both). The modular data integration system 200 may further utilize cloud data storage 326 in conjunction with the data lake 202 and the data warehouse 212 for distributing data to various storage locations in parallel. In one example, the data objects may be integrated to the cloud repository first and then to the data lake 202 and data warehouse in parallel 212. In another example, the data objects may be integrated directly from the plurality of data sources 320a-n into the data lake 202 and the data warehouse 212 in parallel through the modular data channels 328a-f, where the data objects may be first ingested into a DW dataset 316a at the data warehouse 312 and then transferred to a DL dataset 306a at the data lake 302. In another example, the data objects may be first ingested into the DL dataset 306a at the data lake 302 and then transferred to the DW dataset 316a at the data warehouse 312, based on the business use-case or SLA information stored in a data consumer database or entitlement server (see database server 452 of FIG. 4).

The transfer of data from the data lake 202 to the data warehouse 212 can be implemented through ETL (Extract, Transform, Load) or ELT (Extract, Load, Transform) pipelines. ETL/ELT pipelines are designed to handle large volumes of data, converting raw data from its original, often unstructured or semi-structured format in the data lake into the organized, structured format required by the data warehouse. Reverse ETL techniques can be used to transfer data from the data warehouse 212 to the data lake 202. Data can be moved between the data lake 202 and a data warehouse 212 through batch processing or real-time streaming, depending on how often the data needs to be updated and the organization's requirements for data freshness.

Figure 4:
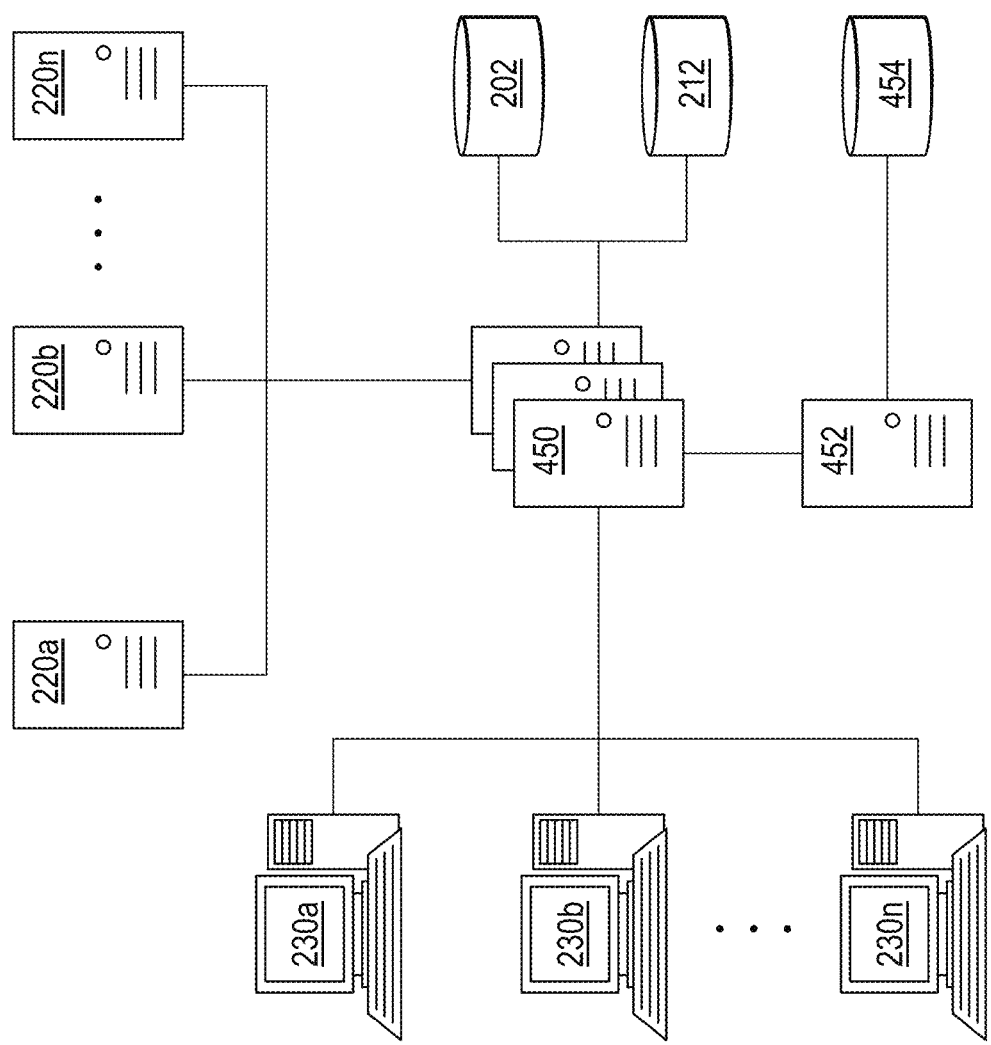
FIG. 4 shows a system architecture diagram for a modular data integration system, comprising a distributed server system, according to at least one aspect of the present invention.

FIG. 4 shows a system architecture diagram for a modular data integration system (FIGS. 2, 3, and 5), comprising a distributed server system 450, according to at least one aspect of the present invention. The data lake 202 and the data warehouse 212 may be configured as part of a distributed server system 450 on a plurality of physical and/or virtual resources within an enterprise system. The server system 450 may receive or request business use-case information from a database server 452 for the plurality of business data consumers 230a-n. The database server 452 may be an entitlement server that stores data integration information, on database 454, specific to individual business use-cases. The data integration information may indicate a configuration data type based on metadata models, data consumer permissions, or data transformation control tables. The server system 450 may ingest or transform the data objects from the data sources 220a-n based on the business use-case for one of the plurality of data sources 230a-n, according to the configuration data type of the business use-case. The data consumers 230a-n may selectively access datasets based on business needs (e.g., business use-cases), with integration options including combined views or materialized datasets to avoid performance bottlenecks. The modular integration channels allow for the distributed server system 450 to run data loads in parallel with minimal integration points.

The modular approach to data integration may prioritize certain data integration channels based on the amount of data objects in a data set, the number of datasets needed by a data consumer, and the format of the data objects. This approach focuses on the relevance of specific datasets to data consumers and integrates data from multiple sources for common use-cases using view-based or materialization approaches. This approach further addresses SLA and performance issues by eliminating unnecessary dependencies and resolving data recovery challenges.

Figure 5:
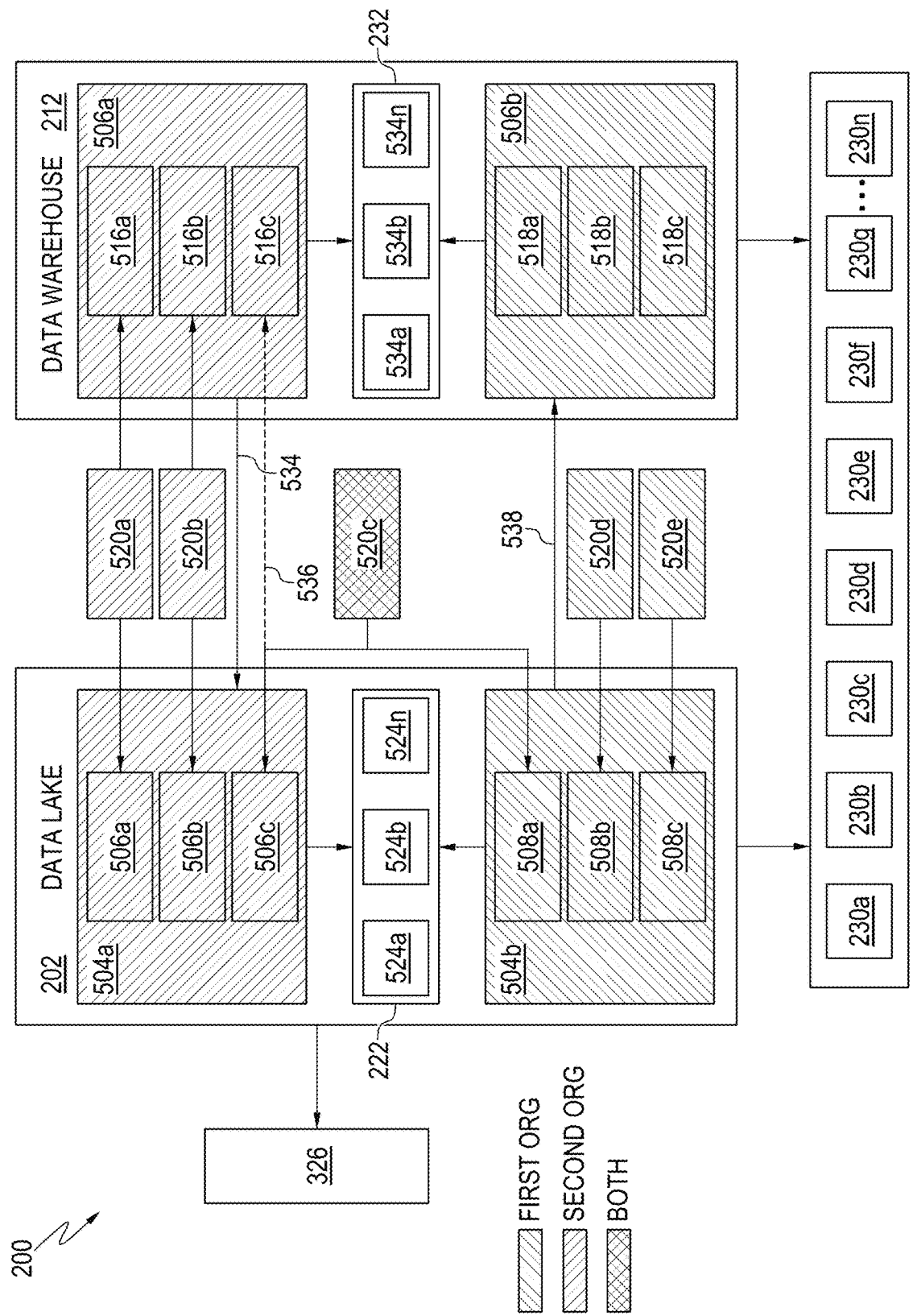
FIG. 5 shows a modular data integration system configured to integrate a plurality of financial advisor (FA) channels into a data lake and an enterprise data warehouse, according to at least one aspect of the present invention.

FIG. 5 shows a modular data integration system 200 according to another embodiment of the present invention, configured, in the illustrated embodiment, to integrate a plurality of financial advisor (FA) channels into a data lake (e.g., Hadoop) 202 and an enterprise data warehouse 212 (e.g., Teradata). The modular data integration system 200 comprises a plurality of data sources 520a-e associated with a first organization, a second organization, or both. The data sources 520a-e may include real-time analytics (RTA) data, a first enterprise database (EDB), provenance, audit, data quality, and traceability (PADT) data, a second enterprise database (EDB'), and a distributed database (e.g., libra or spark). The data objects from the data sources 520a-e may be ingested into a first zone 504a for the first organization in the data lake 202, a second zone 504b for the second organization in the data lake 202, a third zone 506a for the first organization in the data warehouse 212, and a fourth zone 506b for the second organization in the data warehouse 212. The zones (or "landing zones") 504a, 504b, 506a, 508b may be organizational areas or layers within the storage architecture where data are stored and processed according to its stage in the data lifecycle.

The first zone 504a may comprise data in a structured, semi-structured, or raw format including financial data 506a, legacy account data 506b, and account data 506c. The second zone 506a corresponds to the same respective data objects at the first zone 504a, where datasets 516a-c may be in the same structured or unstructured format as datasets 506a-c. The third zone 504b may also comprise data in a structured, semi-structured, or raw format including financial data 508a, legacy account data 508b, and account data 508c. The fourth zone 506b corresponds to the same respective data objects at the third zone 506a, where datasets 516a-c may be in the same structured or unstructured format as datasets 508a-c. Based on the business use-case of one of the plurality of data consumers 530a-h, data objects may be ingested to one zone and then transferred to another 534-538. The data consumers 530a-n may include downstream business services for banking, fraud analysis, risk compliance, BASEL, 3D, Visualization, account statements, sandbox, etc.

The plurality of DL datasets 506a-c, 508a-c are combined into a combined view 222 comprising a plurality of combined datasets 524a-c, where dataset 506a and dataset 508a are combined into a first combined dataset 524a; dataset 506b and dataset 508b are combined into a second combined dataset 524b; and dataset 506c and dataset 508c are combined into a third combined dataset 524c. Similarly, the plurality of DW datasets 516a-c, 518a-c are combined into a materialized view 232 comprising a plurality of materialized datasets 534a-c, where dataset 516a and dataset 518a are combined into a first materialized dataset 534a; dataset 516b and dataset 518b are combined into a second materialized dataset 534b; and dataset 516c and dataset 518c are combined into a third materialized dataset 534c. The materialized datasets comprise structured data allowing for greater utility and performance over the combined datasets, but the additional performance may come at a data availability cost and is not needed for all use-cases.

In one general aspect, therefore, the present invention is directed to computer-implemented methods for provisioning data to a plurality of data consumers in an organization. The method according to various embodiments comprises the steps of: receiving, by a server system, a business use-case for a first data consumer of a plurality of data consumers; determining, by the server system, a data type configuration for the first data consumer based on the business use-case; determining, by the server system, a plurality of datasets associated with the first data consumer; ingesting, by the server system, a plurality of data objects from a plurality of data sources to the plurality of datasets; preparing, by the server system, two or more datasets of the plurality of datasets according to the data type configuration for the first data consumer; and generating, by the server system, a combined view of the two or more datasets in a data lake, and a materialized view of the two or more datasets in a data warehouse, where the materialized view in the data warehouse is not dependent on the combined view of the data lake.

In another general aspect, the present invention is directed to a system for modular data integration. The system comprises a plurality of data sources, a plurality of downstream data consumers, a metadata repository comprising a metadata model, and one or more processors communicably coupled to the metadata repository, the plurality of downstream data consumers, and the metadata repository. The one or more processors is configured to: receive business use-case data for the plurality of downstream data consumers; determine a plurality of data type configurations for the plurality of downstream data consumers based on the business use-case data; determine the plurality of data sources associated with the business use-case data; ingest a plurality of data objects from the plurality of data sources to a plurality of datasets; prepare the plurality of datasets according to the plurality of data type configurations; and generate a combined view of the plurality of datasets in a data lake and a materialized view of the plurality of datasets in a data warehouse. The data lake comprises structured data, semi-structured data, and raw data; the data warehouse comprises the structured data according to the metadata model; and the materialized view in the data warehouse is not dependent on the combined view of the data lake.

According to various implementations, the business use-case is based on a service level agreement associated the first data consumer. According to various implementations, the combined view and the materialized view combine data objects from the plurality of datasets without breaching the service level agreement.

According to various implementations, the two or more datasets comprise a first dataset associated with a first organization and a second dataset associated with a second organization. According to various implementations, the first dataset is ingested to a first zone at the data lake and a second zone at the data warehouse, and the second dataset is ingested to a third zone at the data lake and a fourth zone at the data warehouse. Also, the first zone and the second zone can be associated with the first organization, and the third zone and the fourth zone are associated with the second organization.

According to various implementations, the method also comprises transferring, by the server system, the first dataset from the first zone in the data lake to the second zone in the data warehouse.

According to various implementations, the method further comprises transferring, by the server system, the second dataset from the fourth zone in the data warehouse to the third zone in the data lake.

According to various implementations, the method further comprises: ingesting, by the server system, the first dataset to the first zone in the data lake in a first channel and the second zone of the data warehouse a second channel, where the first channel and second channel are ingested in parallel; and ingesting, by the server system, the second dataset to the third zone in the data lake in a third channel and the fourth zone of the data warehouse in fourth channel, where the third channel and the fourth channel are ingested in parallel.

According to various implementations, the business use-case is determined based on a metadata model or control table associated with the plurality of data consumers. Also, the method can further comprise controlling, by the server system, access patterns by the plurality of data consumers according to the metadata model or the control table associated with the plurality of data consumers.

According to various implementations, the data type configuration indicates a data format, an integration channel priority, and data permissions of the plurality of data consumers. According to various implementations, the method further comprises determining, by the server system, the data permissions of the first data consumer and a second data consumer of the plurality of data consumers, wherein a first dataset is not accessible to the second data consumer based on the data permissions of the second data consumer. The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements.

While various embodiments have been described herein, it should be apparent that various modifications, alterations, and adaptations to those embodiments may occur to persons skilled in the art with attainment of at least some of the advantages. Persons skilled in the art will appreciate that recited operations therein may generally be performed in any order. Also, although various operational flow diagrams are presented in a sequence(s), it should be understood that the various operations may be performed in other orders than those which are illustrated, or may be performed concurrently. The disclosed embodiments are therefore intended to include all such modifications, alterations, and adaptations without departing from the scope of the embodiments as set forth herein.

What is claimed is:

1. A computer-implemented method for provisioning data to a plurality of data consumers in an organization, the method comprising:

receiving, by a server system, a business use-case for a first data consumer of a plurality of data consumers;

determining, by the server system, a data type configuration for the first data consumer based on the business use-case;
determining, by the server system, a plurality of datasets associated with the first data consumer, wherein the plurality of datasets comprise a first dataset and a second dataset;
ingesting, by the server system, the first dataset to a first zone in a data lake in a first channel and a second zone of a data warehouse in a second channel, wherein the first channel and the second channel are ingested in parallel; and
ingesting, by the server system, the second dataset to a third zone in the data lake in a third channel and a fourth zone of the data warehouse in fourth channel, wherein the third channel and the fourth channel are ingested in parallel;
ingesting, by the server system, a plurality of data objects from a plurality of data sources to the plurality of datasets;
preparing, by the server system, two or more datasets of the plurality of datasets according to the data type configuration for the first data consumer; and
generating, by the server system, a combined view of the two or more datasets in the data lake, and a materialized view of the two or more datasets in the data warehouse, wherein the materialized view in the data warehouse is not dependent on the combined view of the data lake.

2. The computer-implemented method of claim 1, wherein the business use-case is based on a service level agreement associated the first data consumer.

3. The computer-implemented method of claim 2, wherein the combined view and the materialized view combine data objects from the plurality of datasets without breaching the service level agreement.

4. The computer-implemented method of claim 1, wherein the first dataset is associated with a first organization and the second dataset is associated with a second organization.

5. The computer-implemented method of claim 4, wherein the first zone and the second zone are associated with the first organization, and the third zone and the fourth zone are associated with the second organization.

6. The computer-implemented method of claim 1, further comprising: transferring, by the server system, the first dataset from the first zone in the data lake to the second zone in the data warehouse.

7. The computer-implemented method of claim 1, further comprising: transferring, by the server system, the second dataset from the fourth zone in the data warehouse to the third zone in the data lake.

8. The computer-implemented method of claim 1, wherein the business use-case is determined based on a metadata model or control table associated with the plurality of data consumers.

9. The computer-implemented method of claim 8, further comprising: controlling, by the server system, access patterns by the plurality of data consumers according to the metadata model or the control table associated with the plurality of data consumers.

10. The computer-implemented method of claim 1, wherein the data type configuration indicates a data format, an integration channel priority, and data permissions of the plurality of data consumers.

11. The computer-implemented method of claim 10, further comprising: determining, by the server system, the data permissions of the first data consumer and a second data consumer of the plurality of data consumers, wherein the first dataset is not accessible to the second data consumer based on the data permissions of the second data consumer.

12. A system for modular data integration, the system comprising:
a plurality of data sources;
a plurality of downstream data consumers;
a metadata repository comprising a metadata model; and
one or more processors communicably coupled to the metadata repository, the plurality of downstream data consumers, and the metadata repository, wherein the one or more processors is configured to:
receive business use-case data for the plurality of downstream data consumers;
determine a plurality of data type configurations for the plurality of downstream data consumers based on the business use-case data;
determine the plurality of data sources associated with the business use-case data;
ingest a plurality of data objects from the plurality of data sources to a plurality of datasets;
ingest a first dataset of the plurality of datasets to a first zone in a data lake through a first channel;
ingest the first dataset to a second zone of a data warehouse through a second channel, wherein the first channel and the second channel are ingested in parallel;
ingest a second dataset of the plurality of datasets to a third zone in the data lake through a third channel;
ingest the second dataset to a fourth zone of the data warehouse through a fourth channel, wherein the third channel and the fourth channel are ingested in parallel;
prepare the plurality of datasets according to the plurality of data type configurations; and
generate a combined view of the plurality of datasets in the data lake and a materialized view of the plurality of datasets in the data warehouse, wherein:
the data lake comprises structured data, semi-structured data, and raw data;
the data warehouse comprises the structured data according to the metadata model; and
the materialized view in the data warehouse is not dependent on the combined view of the data lake.

13. The system of claim 12, wherein the one or more processors is further configured to control access patterns by the plurality of downstream data consumers according to the metadata model associated with the plurality of downstream data consumers.

* * * * *